United States Patent [19]

Kishigami et al.

[11] Patent Number: 5,018,061
[45] Date of Patent: May 21, 1991

[54] MICROPROCESSOR WITH ON-CHIP CACHE MEMORY WITH LOWER POWER CONSUMPTION

[75] Inventors: Hidechica Kishigami, Yokohama; Tohru Sasaki, Kawasaki; Kiyotaka Sasai, Yokohama, all of Japan

[73] Assignee: Kabushiki Kaisha Toshiba, Kawasaki, Japan

[21] Appl. No.: 212,201

[22] Filed: Jun. 27, 1988

[30] Foreign Application Priority Data

Dec. 11, 1987 [JP] Japan .................................. 62-312123

[51] Int. Cl.$^5$ .............................................. G06F 12/00
[52] U.S. Cl. ................................ 364/200; 364/231.8; 364/243.41; 364/273.1
[58] Field of Search ... 364/200 MS File, 900 MS File

[56] References Cited

U.S. PATENT DOCUMENTS

| | | | |
|---|---|---|---|
| 3,761,881 | 9/1973 | Anderson | 340/172.5 |
| 3,764,996 | 10/1973 | Ross | 340/172.5 |
| 4,577,293 | 3/1986 | Matick et al. | 365/189.04 |
| 4,691,277 | 9/1987 | Kronstadt et al. | 364/200 |
| 4,725,945 | 2/1988 | Kronstadt et al. | 364/200 |
| 4,794,524 | 12/1988 | Carberry et al. | 364/200 |
| 4,823,259 | 4/1989 | Aichelmann, Jr. et al. | 364/200 |

OTHER PUBLICATIONS

MC68030 Enhanced 32-Bit Microprocessor User's Manual; Motorola; Section 6, "On-Chip Cache Memories".
1987 IEEE International Solid-State Circuits Conference; Session II:32b Microprocessors; H. Kadota et al., pp. 36-37.
William S. Carter, "A New High Performance Microprocessor with Z80 Software Compatibility", Mini-Micro Conference Record, 8-11 Nov. 1983, Chap. 13/3, pp. 1-6.
I. K. Hetherington et al., "3B20D Processor Memory Systems", The Bell System Technical Journal, vol. 62, No. 1, Part 2, Jan. 1983, pp. 207-220.

Primary Examiner—Eddie P. Chan
Attorney, Agent, or Firm—Foley & Lardner

[57] ABSTRACT

A microprocessor with on-cache memory and an address translation buffer in which it further comprises first and second flip-flop circuits for indicating in hit or miss in the tag field of the cache memory and for storing which of the X and Y sections of the tag field a target data exists. Access to the tag field is carried out prior to access to the data field of the cache memory, thereby preventing access to the data field when a miss occurs in the tag field, and thus decreasing power consumption.

5 Claims, 2 Drawing Sheets

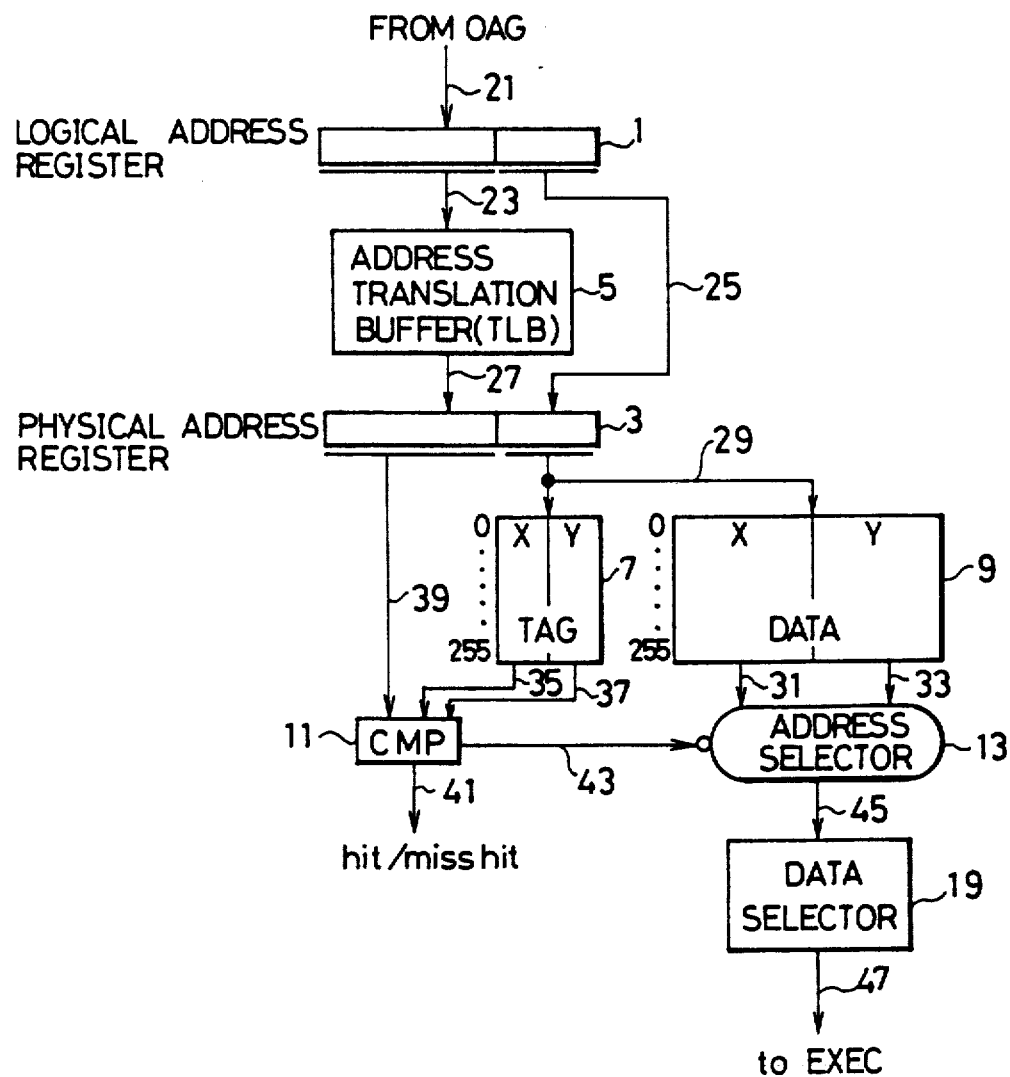

MICROPROCESSOR WITH ON-CHIP CACHE MEMORY WITH LOWER POWER CONSUMPTION

BACKGROUND OF THE INVENTION

1. Field of the Invention

The present invention relates to a microprocessor with an on-chip cache memory and an address translation buffer, and more particularly to a microprocessor of the kind which has at least a two-way set associative structure in a pipeline data processing system.

2. Description of the Prior Art

In the prior art there is known pipeline data processing system having a cache memory and an address translation buffer or translation lookaside buffer (TLB) for performing address translation from virtual to physical address.

FIG. 1 shows one example of a general construction of the pipeline data processing system according to the prior art. In the figure, the system consists of seven stages, from an instruction fetch stage (IF) to an operand storing stage (STORE). Namely, the pipeline system consists of an instruction fetch stage (IF) an instruction decode stage (ID), a virtual address calculation stage (OAG), an address translation stage (TLB), an operand read stage (TAG.DATA), an instruction execution stage (EXEC) and an operand storing stage (STORE).

FIG. 2 shows the detailed construction of the combined address translation stage TLB and the operand read stage TAG.DATA in the pipeline data processing system. In the figure, reference numeral 1 indicates a logical address register, 3 indicates a physical address register, 5 an address translation buffer (TLB), 7 the tag field of a two-way set associative cache memory, 9 the data field of the associative cache memory, 11 a comparator, 13 a selector and 19 a data sector.

In operation, each of the logical addresses 21 calculated in the stage OAG is registered in the logical address register 1. Among the logical addresses 21 thus registered in the address register 1, the number of bits corresponding to a page in a virtual memory (e.g., the upper 20 bits of, for instance, 32-bit processor), is applied to the address translation buffer 5, where they are translated into a 20-bit signal for the physical address 27. The upper 20 bits of the physical address 27 are registered in the upper 20-bit positions of the physical address register 3.

On the other hand, among the logical address bits registered in the logical address register 1, the remaining lower 12-bit address 25 is registered in the 12-bit position of the physical address register 3 without any change in the address translation. All of the above operations are performed in the stage TLB.

Description of the operations performed in the TAG.DATA will now be made. The TAG. DATA cache structure is two-way set associative and is composed of the tag field 7 having X and Y sections and the data field 9 also having X and Y sections.

In the X and Y sections of the data field 9 there is formed about 256 lines each having 4K bytes, constituting the total capacity of 8K bytes about the data field 9. Data is stored in the data field 9 with each line being one unit. Moreover, each line forms a single unit when it is desired to check by the comparator 11 whether or not data to be sought exists in the data field 9, the details of which will be described later.

Each line having the same number as that which can exist in the lines from 0 to 255 in the X and Y data field is selected using partial data in the logical address. When a target data held in the logical address register 1 exists in one of the two lines thus selected, it results in a cache hit. When the target data held in the logical address register does not exist in either of the two lines, it results in a miss.

On the other hand, in each of the X and Y sections of the tag field 7, there is provided 256 tags from 0 to 255 where each of the lines corresponding to the data cache 9 is retained. As one example of this attribute, it may be a valid bit which indicates whether or not the upper 20 bits of data stored in the physical address register 3 are also stored in the corresponding data cache 9. The reading-out of the target data from the data cache 9 is carried out in the following manner.

Each line having the same number is selected from each of the X and Y sections of the data field 9, and eight bits 29 with bit numbers ranging from 20 to 27 among the physical address are stored in the physical address register 3. The output signals 31 and 33 indicate these addresses selected, assuming that the most significant bit is equal to 0.

Moreover, the attributes relating to the lines thus read from the X and Y sections of the data field 9 are read from the tag field 7 by the eight-bit value 39 of the physical address retained in the physical address register 3, so as to produce either cache hit or miss. When a hit occurs, a determination is made as to whether the hit occurs in the lines 31 of the X section or in the lines 33 of the Y section of the data field 9, and the result of the determination (i.e., the output signal 43) is applied to a selector 13.

The selector 13 selects either one of the output signals 31 or 33, which has resulted in a cache hit, and its hit output signal 45 is applied to the data selector 19. The data selector 19 selects and produces necessary data 47 in accordance with the lower four bits of the physical address and the 16-byte size of the input signal 45, which is to be executed in the next execution stage EXEC in the pipeline data processing system.

As described in the above two-way set associative cache memory according to the prior art, the reading-out of data was carried out by electrically activating the data cache memory, regardless of cache hit or miss conditions. In addition, in the two-way set associative cache memory, the target data is actually held in one line in either one of the X or Y sections of the data field thus divided. Nevertheless, a plurality of the lines in the X and Y sections are activated for reading-out data.

The above problems become striking in the one-chip microprocessor having a two-way set associative cache in order to increase cache hit efficiency;

(1) In the one-chip microprocessor, it is extremely important to decrease the power consumption in order to decrease the heat generation and to lower the operation temperature, as well as to improving its reliability. However, when the multi-level cache memory mapping system such as a four-way set associative cache is employed, the data volume to be read out of the data field must be increased, which requires more time than that for the direct cache system. As a result, power consumption is also considerably increased for data read-out.

(2) Since the data read-out function is performed in the data field even in the case of a miss, it results in wasted power consumption for that operation, as well as a decrease the processing speed of the microprocessor because of time wasted on this useless operation. Specifically, since the size of the cache memory is limited in the microprocessor, the upper limit of the cache memory capacity that can be incorporated in the chip in these days is rather small, totaling about 8 k-bytes, and the miss rate in the cache memory can become as large as 10%.

SUMMARY OF THE INVENTION

It is therefore an object of the present invention to overcome the above drawbacks and provide a microprocessor with a on-chip cache memory and a address translation buffer (TLB) in which useless data access to the data field of the cache memory can be avoided.

It is another object of the present invention to provide a microprocessor with an on-chip cache memory and a TLB in which access to the tag field of the cache memory is carried out prior to accessing the data field, and such that the access to the data field is performed only when a cache hit occurs as the result of the comparison of the physical address with the contents of the tag field.

It is still another object of the present invention to provide a microprocessor with an on-chip cache memory and a TLB in which, when a miss occurs during the comparison of the physical address and the contents of the tag field, unnecessary data read-out from the data field of the cache is prevented, thereby decreasing the power consumption and realizing a high speed operation of the microprocessor in the pipeline data processing system type.

One of the features of the present invention resides in a microprocessor with an on-chip cache memory and a TLB, as well as a logical address register and a physical address register, wherein the cache memory is at least a two-way set associative cache comprising a tag field having X and Y sections and a data field also having X and Y sections. The microprocessor further comprises a comparator for comparing each of the converted addresses from the TLB with each of the predetermined number of bits of the X and Y sections, a first flip-flop for storing signals that indicate the section in which target data exists, and a second flip-flop for storing the result of the comparison, such as a cache hit or a cache miss, whereby access to either the X or Y sections of the data is carried out only when a cache hit occurs in the comparison of the converted physical address and each of the contents of the tag field.

These and other objects, features and advantages of the invention will be better understood from the following embodiment of the invention with reference to the accompanying drawings.

BRIEF DESCRIPTION OF THE DRAWINGS

FIG. 1 is a general block diagram of the pipeline data processing system in a microprocessor according to the prior art, FIG. 2 is a detailed hardware construction of the TLB and TAG.DATA stages in the system of FIG. 1.

DETAILED DESCRIPTION OF THE PREFERRED EMBODIMENTS

Figure 3:
FIG. 3 is a general block diagram of the pipeline data processing system in a microprocessor on-chip cache memory and a TLB according to the present invention.

FIG. 3 shows a block diagram of one embodiment of the pipeline data processing system in a microprocessor with an on-chip two-way set associative cache. In FIG. 3, the difference between the present invention and the prior art shown in FIG. 1 in the pipe line data processing system is that the combined TAG and DATA stages in the cache memory in the prior art is functionally separated and the TAG stage is combined with the address translation stage, while the DATA stage of the cache memory functions independently.

The other remaining sections or stages are the same as those shown in FIG. 1 according to the prior art. Namely, in FIG. 3, the same reference numerals indicate the same structural elements shown in FIG. 1.

Figure 4:
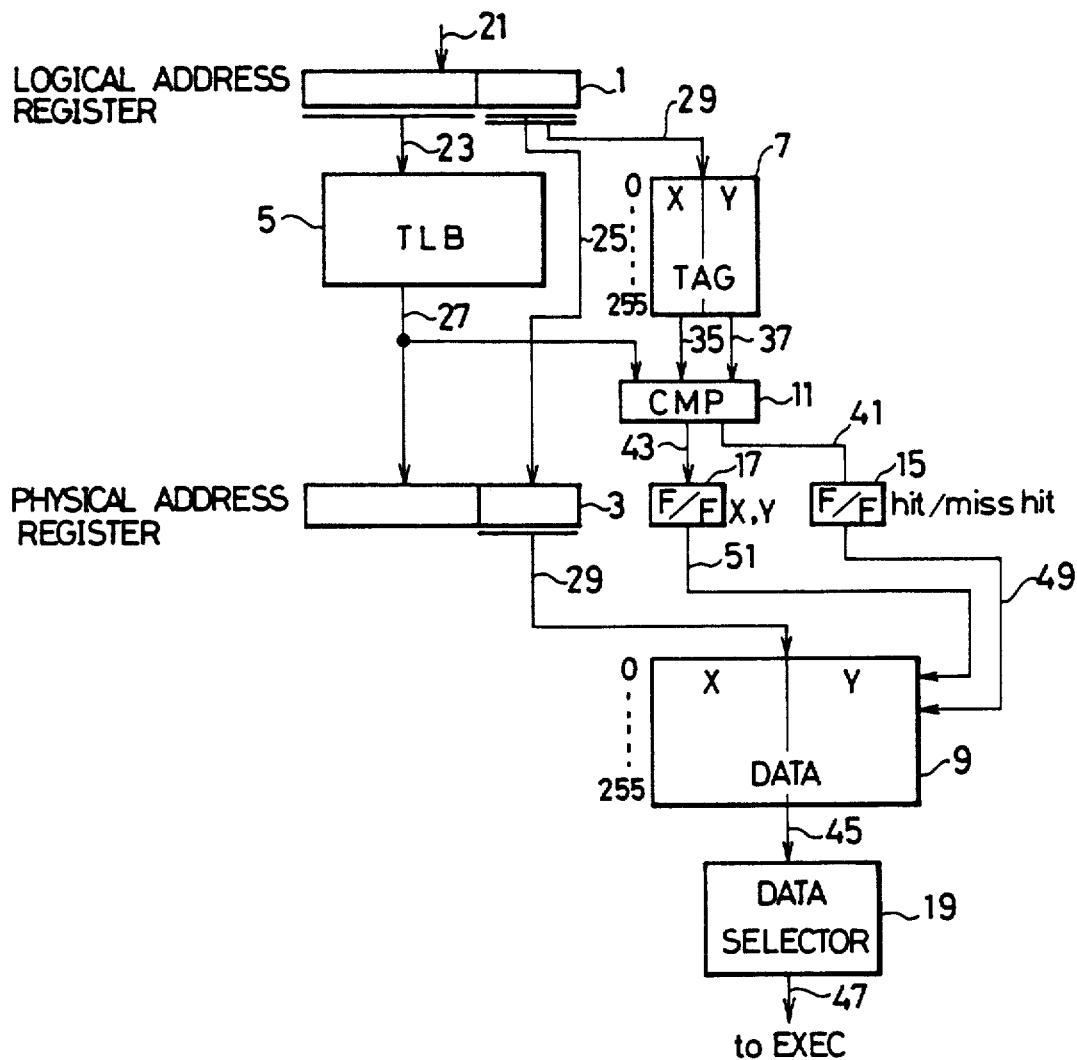
FIG. 4 is a detailed construction of the TLB.TAG and DATA STAGES of the pipeline data processing system of the microprocessor on-chip cache memory and the TLB according to the present invention.

FIG. 4 shows a detailed hardware construction of the TLB.TAG stage and DATA stage portions in the pipeline system in FIG. 3. In the figure, the combined TLB and TAG field and the DATA field of the cache memory further comprises two flip-flop circuits 15 and 17, instead of the selector 13 according to the prior art shown in FIG. 1.

Access to the data field 9 of the cache memory is controlled by the output signals 49 and 51 from the flip-flop circuits. In FIG. 4, the same reference numerals indicate the same structural elements as those shown in FIG. 2, and 32-bit data processing is also to be carried out in the present invention. The upper 20 address bits of a logical address registered in a logical address register 1 in the stage TLB and TAG in the pipeline system is applied to an address translation buffer 5 and it is converted into the upper 20-bit signal 27 of the physical address and is then registered in the physical address register 3 in the same manner as explained in the prior art shown in FIG. 2, while the remaining lower 12-bit signal 25 of the logical address is directly applied to the physical address register 3.

Moreover, the 8-bit data 29 of the bit positions from 20 to 27 of the logical address registered in the logical address register 1 are applied to the tag field 7 and attributes concerning the lines of X and Y sections of the tag field designated by the 8-bit data 29 are selected in accordance with the input signals thereof. Among the attributes thus selected, each of the upper 20-bit physical address 35 and 37 of the X and Y sections is produced from the tag field 7 and is applied to the comparator 11, where each of the upper 20-bit physical addresses is compared with the converted physical address from the TLB 5 and either a cache hit or miss output signal is produced from the comparator 11. The result of the comparison 41 is applied to the input of the flip-flop circuit 15. In this case, when the cache hit occurs, a signal 43 is output which is representative of whether a target data designated by the logical address contained in the logical address register 1 exists or not. If it exists the signal 43 represents which section of the X and Y sections of the TAG field 7, is retained in the flip-flop 17.

In the next data stage in the pipeline system, when the output signal representative of the cache hit from the flip-flop 15 is applied to the DATA field 9 (i.e., DATA stage) for access of data. In this case, since the section in which the target data exists can be known from the output signal 51, only the lines of each section in which actual target data exists are electrically activated for read out, and a signal 45 is produced.

The output signal 45 is applied to a data selector 19 where necessary data 47 is selected from the signal 45 in accordance with the lowest 4 bits and with the data size of the physical address 3, for the subsequent execution in the EXEC stage.

In the foregoing embodiment, more specifically a multi-way set associative cache system the two-way set cache has been used. However, other cache systems can also be used in the system according to the present invention in which access to the data field of the cache can be dispensed with when a miss occurs, thus realizing a decrease in power consumption for the microprocessor according to the pipeline data processing system, as well as improving the processing performance.

In addition, according to the present invention, since the signal for indicating the section in which the target data is contained is produced and an output signal representative of only a cache hit is applied to the data field of the cache for access, the useless data access to the data field of the cache can be avoided, regardless of the type of memory.

The following effects can be obtained from the microprocessor with an on-chip cache and a TLB.

1. The access to the tag field of the cache memory is carried out prior to accessing the data field in the pipeline data processing system, so that the data volume to be read from the data field of the cache can be minimized, thereby preventing any extra power consumption, even when multiplicity of the mapping system is employed, for instance, from a direct system for the purpose of increasing the cache hit rate without strikingly increasing power consumption.

2. Since the data read-out from the data field of the cache is not carried out when a miss occurs, unnecessary data read-out as well as useless power consumption can be prevented.

3. Since the determination of either cache hit or cache miss is carried out at an earlier stage in the present invention than that in the prior art, the transaction for the miss can be started earlier than the one according to the prior art, thereby improving the processing speed of the microprocessor. As a result, when the present invention is applied to microprocessors, such as microprocessors having a small cache memory and a rather large miss rate, power consumption can be reduced and processing speed can be strikingly improved.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A microprocessor for performing instruction execution by using pipelined processing, comprising:
 a logical address register, which stores a logical address of a memory read or write operand;
 a physical address register, which stores a physical address of a memory read or write operand;
 a translation lookaside buffer (TLB), coupled to said logical address register and physical address register, to receive an upper value of the logical address, convert the upper value into a corresponding upper value of the physical address, and send it to said physical address register;
 an on-chip cache memory comprising a tag memory having at least two (X and Y) sections and data memory also having at least two (X and Y) sections, said tag memory being coupled to said logical address register and containing a plurality of upper values of physical addresses for data in said data memory, said data memory being coupled to said physical address register and receiving a lower value of the physical address in said physical address register wherein access by the logical address to said tag memory is carried out prior to a corresponding access of the data memory by the physical address;
 comparator means for comparing the upper value of physical address from said TLB and the upper value of physical addresses from sections (X and Y) of said tag memory and for outputting a result of comparison;
 first storage means, coupled to said comparator means and said data memory, for storing the result of comparison indicating in which of the sections (X or Y) of said data memory a target data exists, and controlling said data memory so that only one of said sections (X and Y) is accessed; and
 second storage means, coupled to said comparator means and said data memory, for storing the result of comparison which is a cache hit or a cache miss, and controlling said data memory to be accessed only when the result shows a cache hit.

2. The microprocessor as claimed in claim 1, wherein a total number of bits to be processed is 32 bits and the upper 20 bits in said logical address register are converted by the TLB into the upper 20 bits in said physical address register, and the lower 12 bits in said logical address register are directly set to the lower 12 bits in said physical address register without conversion.

3. The microprocessor as claimed in claim 1, wherein eight bits from the bit positions 20 to 27 in said logical address register are applied to said tag memory and eight bits from the bit positions 20 to 27 in said logical address register are applied to said data memory.

4. A cache and translation lookaside buffer system using pipelined processing, comprising:
 a logical address register, which stores a logical address of a memory read or write operand;
 a physical address register, which stores a physical address of a memory read or write operand;
 a translation lookaside buffer (TLB), coupled to said logical address register and said physical address register, to receive an upper value of the logical address, convert the upper value into a corresponding upper value of the physical address, and send it to said physical address register;
 a cache memory comprising a tag memory having at least two (X and Y) sections and a data memory having at least two (X and Y) sections, said tag memory being coupled to said logical address register and containing a plurality of upper values of physical addresses for data in said data memory, said data memory being coupled to said physical address register and receiving a lower value of the physical address in said physical address register wherein access by the logical address to said tag memory is carried out prior to a corresponding access of the data memory by the physical address;

comparator means for comparing the upper value of physical address from said TLB and the upper value of physical addresses from sections (X and Y) of said tag memory and for outputting a result of comparison;

first storage means, coupled to said comparator means and said data memory, for storing the result of comparison indicating in which of the sections (X or Y) of said data memory a target data exists, and controlling said data memory so that only one of said sections (X and Y) is accessed; and a second storage means, coupled to said comparator means and said data memory, for storing the result of comparison which is a cache hit or a cache miss, and controlling said data memory to be accessed only when the result shows a cache hit.

5. The cache and translation lookaside buffer (TLB) system as claimed in claim 4, wherein a total number of bits to be processed is 32 bits and the upper 20 bits in said logical address register are converted by the TLB into the upper 20 bits in said physical address register, and the lower 12 bits in said logical address register are directly set to the lower 12 bits in said physical address register without conversion.

* * * * *